UNITED STATES PATENT OFFICE.

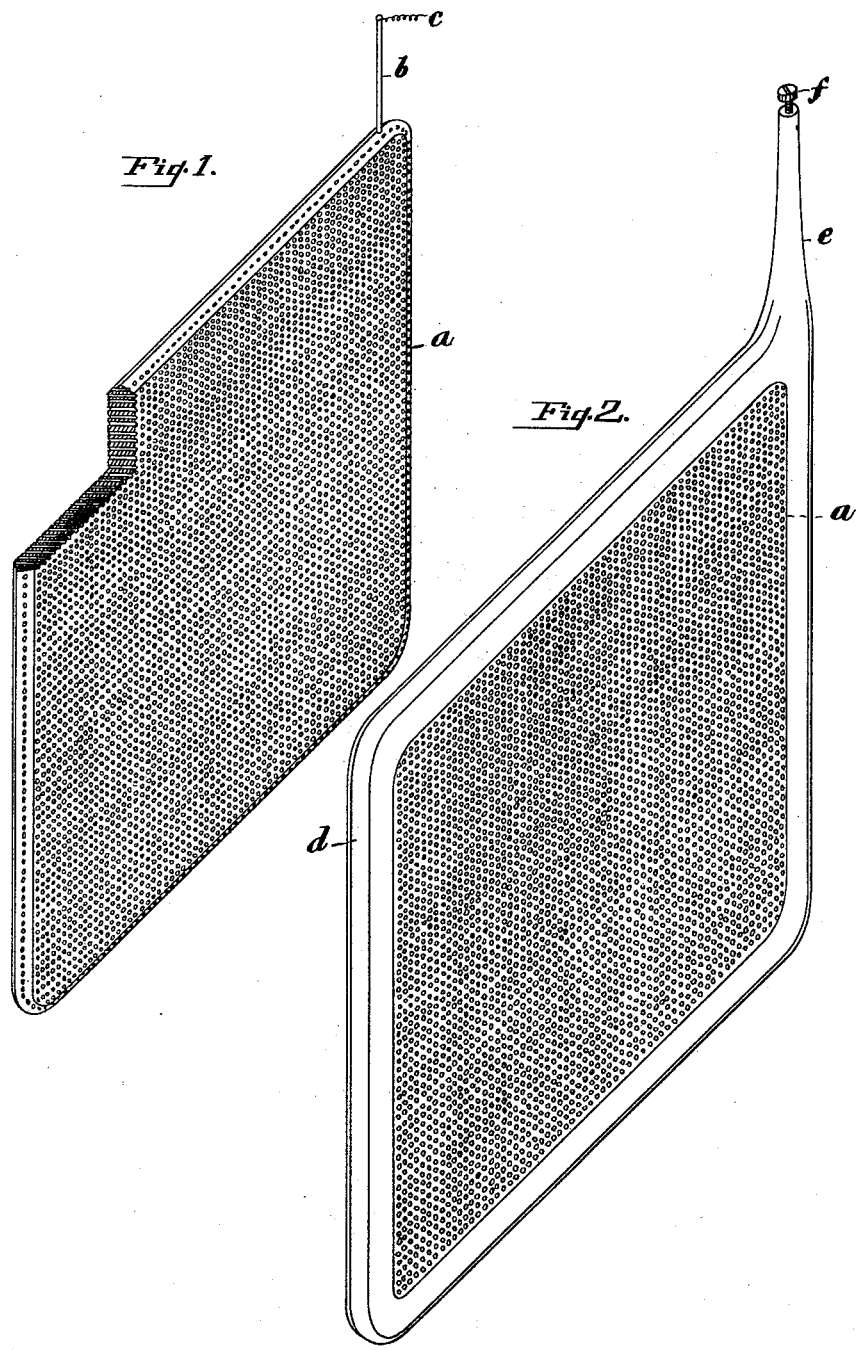

CLÉMENT PAYEN, OF PHILADELPHIA, PENNSYLVANIA, ASSIGNOR TO THE ELECTRIC STORAGE BATTERY COMPANY, OF GLOUCESTER CITY, NEW JERSEY.

SECONDARY BATTERY.

SPECIFICATION forming part of Letters Patent No. 415,331, dated November 19, 1889.

Application filed August 14, 1888. Serial No. 282,730. (No model.)

*To all whom it may concern:*

Be it known that I, CLÉMENT PAYEN, a citizen of the Republic of France, but now residing at the city of Philadelphia, in the county of Philadelphia and State of Pennsylvania, have invented certain new and useful Improvements in Secondary Batteries, of which the following is a specification.

My invention relates to the manufacture of plates or electrodes of secondary or storage batteries.

The principal object of my invention is to produce a porous crystallized metal plate or electrode having substantial strength, and with the crystalline atomic aggregation of the plate formed in columns with cells between them.

My invention consists, essentially, in subjecting one or more salts of the metals mixed or combined with asbestus, amianthus, or analogous material to fusion, then crystallizing the mass or mixture, and then reducing the same to a metallic state, whereby will be produced a porous crystallized metal plate having substantial strength.

In order that my present invention may be fully understood, I will now proceed to describe the manner of conducting the process for the production of such a plate, and hereby refer to one of my applications for a patent, filed June 12, 1888, and serially numbered 277,154, as illustrating apparatus in one form for the conduct thereof.

A charge of a salt of a metal—such as chloride of lead—is melted or fused in a furnace and a varying quantity or percentage of asbestus, amianthus, or other analogous material added or combined therewith. This latter material or materials may be added to the charge of chloride of lead either before, during, or at the moment the point of fusion of the chloride of lead has been reached, and when the mixture or mass has been fused it is then discharged into a mold, wherein in cooling it will become crystallized.

It may be remarked that due regard should be had to the selection of the material for the formation of the mold, and the interior surface thereof should be perfectly smooth. The mold to which preference is given is one made of either brass or bronze and composed of two symmetrical sections hinged together.

In practice it has been found that when a fused mass is poured into a two-part mold of equal thicknesses of metal the mass will commence to cool from each side, and the crystals composing the same will meet or unite with each other at their summits, sides, or facets, forming columns uniformly throughout the mass solidifying, and the columns of crystals thus formed from the respective sides of the mold meet or unite at the median line of the structure. On the other hand, if the parts of the mold are of unequal thicknesses of metal, the crystals of the mass will commence to cool therein from the side having the greater thickness of metal and will meet the mass forming in columns from the opposite side of the mold beyond the median line of the structure. Preference, however, is given to a mold having equal thicknesses of metal for the formation of the plates or other structures, because excellent results have been obtained. The mixture or mass having assumed crystallized form in the manner described, and having been removed from the mold, may then be subjected to the following treatment for reduction to a metallic state:

In a vase containing sulphuric acid and water in the proportion of ten per cent. (more or less) a series of the chloride plates are mounted and alternated with plates of equal dimensions composed of ordinary lead, artificial charcoal, or other material. The two systems of plates properly insulated from each other and from the vase are mounted so that they will not wabble, whereby all tendency of the chloride plates in the process of reduction to bulge or warp will be obviated. This is important, because if the plates were allowed to wabble in the vase their strength as well as their general character would be impaired to a greater or less extent, and thus their utility for subsequent use would be very materially interfered with.

The two systems of plates having been mounted in the vase in the manner described, wires are connected therewith from the positive and negative electrodes of a dynamo. The system of crystallized chloride plates is in connection with the negative electrode of the dynamo, while the system of lead, charcoal, or other plates is in connection with the positive electrode of the dynamo, and in the ensuing electrolytic action which thereby takes place the oxygen and chlorine are separated and caused to attack the system of lead, charcoal, or other plates, while the system of crystallized plates will be reduced to a metallic state with the asbestus, amianthus, or other analogous material contained therein.

Another mode of reducing the crystallized chloride plates to a metallic state by chemical action may be availed of and carried out in the following manner: In a vase containing a solution of a chloride or salt and water, preferably sal-ammoniac, in the proportion of five to ten per cent., more or less, a series of crystallized chloride plates is arranged alternately in contact with a series of metallic zinc or other plates of equal dimensions. It may be remarked that it is well to exercise some care in the selection of material for forming with water the solution to immerse the plates in, and preference is given to a salt for the solution belonging to the same family as the salt or salts of which the crystallized plates are mainly composed. If a series of crystallized plates arranged in contact with a series of metallic zinc or other plates of equal dimensions be immersed in a solution of sal-ammoniac and water in a vase for from twelve to fifteen hours, more or less, the effect produced by the chemical action taking place upon the crystallized plates will be to eliminate the chlorine contained therein and to cause any foreign elements that may be contained in said plates to combine with the solution in the vase and leaving said plates in a strong porous crystallized metallic state. The porous crystallized metallic plates treated as described by electrolytic or chemical action, or both, may then be removed from the vase and thoroughly washed and then dried by a gentle heat, whereby they will be brought to a strong porous crystallized metallic state for use as the plates or elements of secondary or storage batteries.

In the accompanying drawings I have illustrated porous plates produced in accordance with my invention, and in which—

Figure 1 is a perspective view of a porous crystallized metal plate partially broken away to illustrate how the crystals or atomic aggregation thereof exist in columns therein, and Fig. 2 is a similar view of said plate having a supporting-frame cast around the same, with a lug forming a terminal, and to which a wire may be attached.

Referring to the drawings, $a$ represents a porous crystallized metal plate or element made in accordance with my invention, having the atomic aggregation composing the same formed in columns.

$b$ is a platinum or other suitable bar inserted into the edge of the plate and forming a terminal, and to which is attached a wire $c$.

$d$, Fig. 2, is a narrow supporting-frame cast around the porous crystallized metal plate $a$ and having formed integral therewith a lug $e$, forming a terminal. Into the upper extremity of the terminal $e$ is inserted a screw $f$, for firmly holding the ends of wires twisted or wound around the threaded shank of the screw to permit of the passage of a current from a dynamo for the storage of electrical energy for subsequent redevelopment or use when a series of the porous crystallized metal plates have been suitably mounted in battery.

One of the principal advantages incident to the use of asbestus, amianthus, or analogous material with a salt or salts of a metal or metals is that the cast chloride or other plate may be readily reduced by either electrolytic or chemical action to a metallic state. The asbestus or amianthus will not be attacked chemically by the salt or salts in the crystallizing or reduction stages of the process, and they thus add strength to the finished product, and thereby adapt the same to form an electrode for storage-battery purposes.

I desire it to be distinctly understood that I do not wish to limit myself to the use of chloride of lead, as any other salt or salts of the metals may be used or combined with asbestus, amianthus, or other analogous material or materials for the production of a battery-plate in accordance with my invention.

Having thus described the nature and objects of my invention, what I claim as new, and desire to secure by Letters Patent, is—

1. The method of producing a porous crystallized metal plate or element, which consists in subjecting one or more salts of the metals and asbestus, amianthus, or analogous material or materials to fusion, then causing the mixture or mass to assume a crystallized form, and then reducing the same to a metallic state, substantially as and for the purposes set forth.

2. The method of producing a porous crystallized metal plate or element, which consists in subjecting one or more salts of the metals and asbestus, amianthus, or analogous material or materials to fusion, then causing the mixture or mass in cooling to assume a crystallized form, and then reducing the structure by chemical action to a metallic state, substantially as and for the purposes set forth.

3. The method of producing a porous crystallized metal plate or element, which consists in subjecting one or more salts of a metal or metals and asbestus, amianthus, or analogous material or materials to fusion, then causing the mixture or mass in cooling to become crystallized, then casting a frame around said plate or structure with a lug, and then reducing by electrolytic action to a metallic state, substantially as and for the purposes set forth.

In witness whereof I have hereunto set my signature in the presence of two subscribing witnesses.

CLÉMENT PAYEN.

Witnesses:
FRANK C. LEWIN,
GEO. W. REED.